Aug. 10, 1948.   J. J. BLACK   2,446,517
ANTIFRICTION TRAILER PROP
Filed Dec. 6, 1944   2 Sheets-Sheet 1
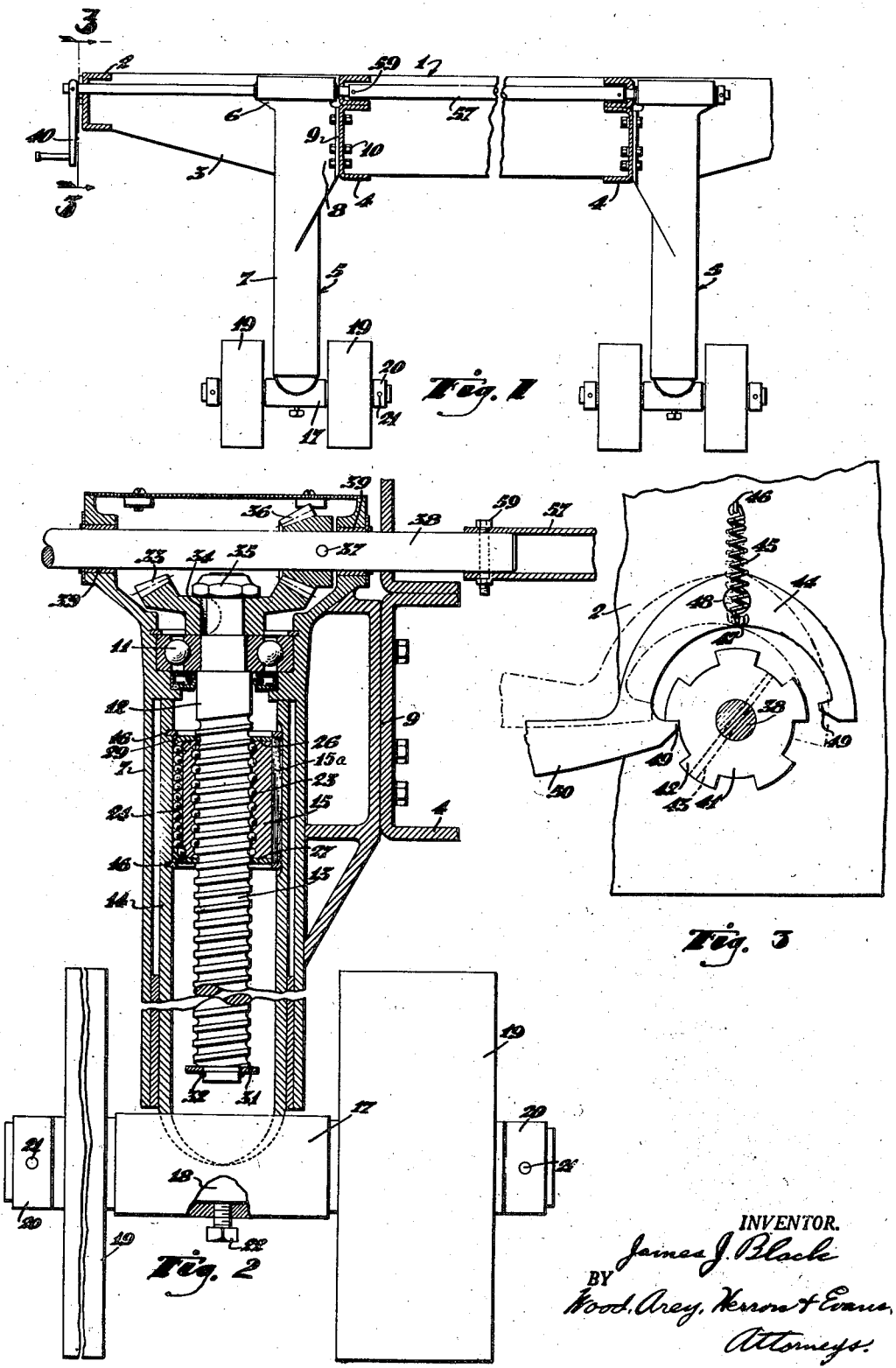
INVENTOR.
James J. Black
BY
Wood, Arey, Herron & Evans,
Attorneys.

Aug. 10, 1948.     J. J. BLACK     2,446,517
ANTIFRICTION TRAILER PROP
Filed Dec. 6, 1944     2 Sheets-Sheet 2
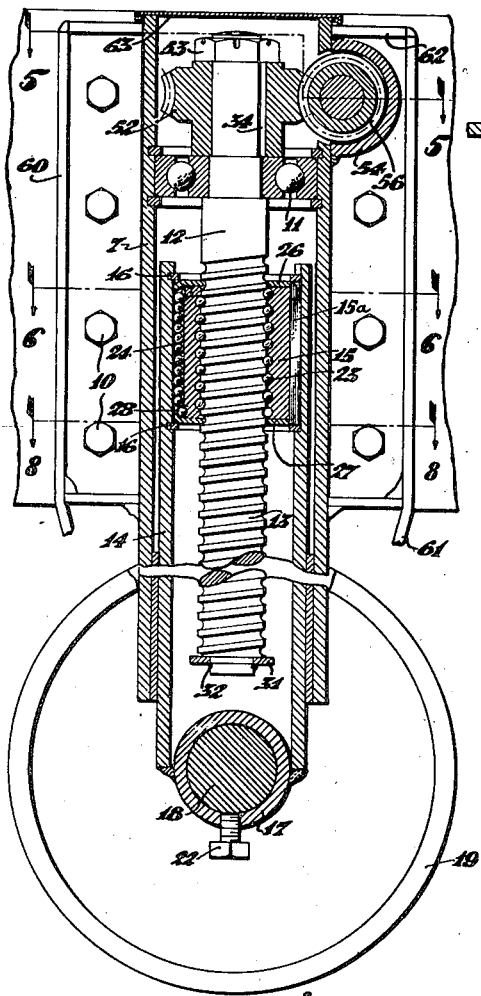
Fig. 4
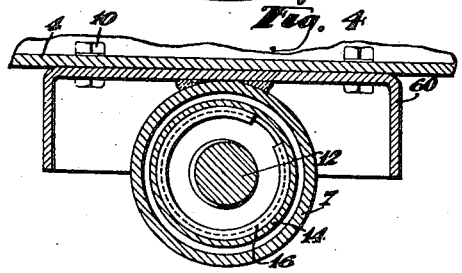
Fig. 8
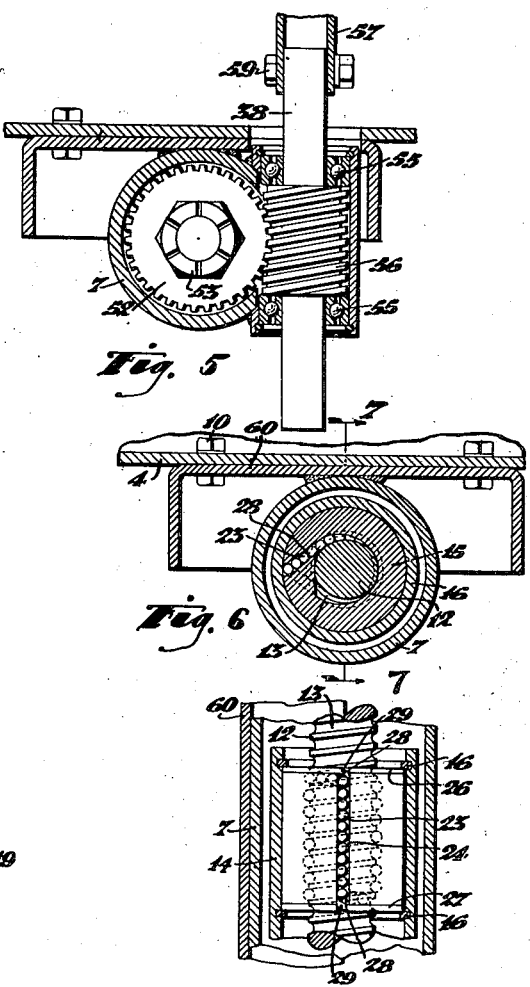
Fig. 5
Fig. 6
Fig. 7
INVENTOR.
James J. Black
BY
Wood, Arey, Herron & Evans
Attorneys Patented Aug. 10, 1948

2,446,517

UNITED STATES PATENT OFFICE 2,446,517

ANTIFRICTION TRAILER PROP

James J. Black, Cincinnati, Ohio, assignor to The Trailmobile Company, Cincinnati, Ohio, a corporation of Delaware Application December 6, 1944, Serial No. 566,824

5 Claims. (Cl. 254—86)

1

This invention relates to trailer vehicles and it is directed particularly to the props for supporting the front end of the trailer when it is detached from the tractor.

The principal object of the invention has been to provide adjustable props which normally are raised or elevated to an out-of-the-way position when the trailer is under way and which may be lowered into engagement with the ground to support the front end load of the trailer before the tractor is detached.

More specifically, the object has been to provide an adjustable prop operated from a crank at the side of the trailer which requires less force for operation than in the structures heretofore employed. In the past, gearing providing a mechanical advantage has been utilized for this purpose but the operator still is required to exert considerable pressure upon the crank to make the adjustment or, if the mechanical advantage is high, then the adjustment requires too much time. Either factor is an important consideration, particularly in the case of trailer transportation about a city where the driver often is required to manipulate the prop, either raising it or lowering it, ten or twelve times or more during the day's work.

Briefly, and in accordance with this invention, a prop is constructed employing a non-locking screw and nut, suitable gearing operable by a crank and arranged to rotate either the nut or the screw to effect a relative movement between the two, and a lock for positively preventing relative movement of the screw and nut either under its own weight or under the weight load of the trailer. In this construction, by virtue of the non-locking screw and nut, the prop either is able to lower itself through its own weight load, or is capable of being lowered with the exertion of little or no force upon the crank. The elevation of the prop to its raised position is facilitated by reason by reason of the fact that the non-locking screw and nut operate with a minimum of friction and enable any mechanical advantage which is built into the gearing to be exerted directly into the lifting of the prop structure. The lock mechanism through which the prop is held in a rigid and uncollapsible condition in accordance with the invention either may be built directly into the gearing in the form of a worm and worm wheel through which rotary motion is imparted from the crank, or it may be in the form of a positive latching device in which event conventional bevel gears may be employed to transfer the motion from the crank.

Other features and further advantages of the invention are disclosed in the following detailed description of the accompanying drawings in which a preferred embodiment of the improvement is illustrated.

2

In the drawings:

Figure 1 is an elevation through the trailer chassis showing the mounting of the props thereto.

Figure 2 is a cross sectional elevation taken through the prop showing the non-locking screw and gearing details.

Figure 3 is a fragmentary sectional view taken on the line 3—3 of Figure 1 showing one type of positive lock for preventing relative rotation of the prop, nut and screw.

Figure 4 is a view similar to Figure 2 showing a modified form of gearing for the prop in which a worm and worm wheel provide mechanical advantage for easy prop actuation, and means for locking the screw against unintentional movement.

Figure 5 is a sectional view taken on the line 5—5 of Figure 4.

Figure 6 is a cross sectional view taken on the line 6—6 of Figure 4.

Figure 7 is a fragmentary sectional view taken on the line 7—7 of Figure 6 showing details of the non-locking nut and screw assembly.

Figure 8 is a cross sectional view taken on the line 8—8 of Figure 4.

The trailer vehicles to which the invention may be applied may be of the conventional type comprising a frame or chassis indicated generally at 1, made up of outer side rails 2 which are interconnected by the cross braces or bolsters 3, the latter in turn supporting the intermediate channel members 4 to which the props, indicated generally at 5, are mounted. Other details of the trailer chassis, the wheel suspension, and the fifth wheel form no part of the present invention and therefore are not disclosed here in detail.

Each of the props 5 comprises an upper housing portion 6 having a tube 7 extending downwardly therefrom and a bracket portion 8 which is either cast integrally with the tube and housing or welded thereto whereby a face 9 is provided for attachment of the prop to a face of a member 4 of the chassis. The bracket portion extends outwardly beyond the tube at each side thereof and is drilled to receive bolts 10 which pass through channel 4. In this manner the prop casing is fastened rigidly to the trailer chassis.

At the lower part of the head 6 it is bored out to provide a seat for a bearing 11 which rotatably supports a screw 12. This screw extends downwardly within the tube 7 where it carries a thread 13. Another tube 14 extends within the tube 7 and around the screw 13. This tube carries a nut 15 for engagement with the screw 13, the nut being held against longitudinal movement by expansible rings 16 which abut each end of the nut 15 and, in turn, are removably seated within grooves in the tube 14 as shown in cross section in Figure 8. The nut 15 is secured against rotation in the tube 14 by means of a key 15a.

The lower end of the tube 14 is notched transversely to receive an axle member 17 which is bored out for passage therethrough of an axle 18. The tube 14 is welded to the member 17 while the axle itself projects beyond the ends of the member 17 to carry prop wheels 19. Collars 20—20 pinned to the axle as at 21 hold the wheels 19 in place. The axle 18 either may rotate freely in the axle tube 17 or, as shown in the drawings, the latter may be provided with a set screw 22 to hold the axle against rotation and thereby permit the wheels 19 to rotate about it.

The structures heretofore available, using the conventional screw, are stiff and the screw is rotated only upon exertion of considerable pressure. In the present improvement, however, both the screw 12 and nut 15 have female thread grooves and are threadedly interconnected by a series of balls 23 which ride in the helical passageways delineated by the thread grooves, each ball rotating upon its own axis as it moves through the passageway and thereby substantially reducing the friction when the screw assembly is operated.

As the balls roll they move from one end of the nut to the other and the nut has another passageway 24 for returning the balls to their starting position when they have passed through the nut and emerge at one end thereof. This passageway extends longitudinally of the nut from one end to the other and terminates at end caps 26 and 27. The endwise faces of the nut have grooves 28 which extend from the points of termination of the thread grooves, at the nut bore into connection with the longitudinal return groove 24 as shown in Figure 6 while the end caps 26 and 27 have lips 29 bent slightly into the groove 24 for directing the balls along their proper course of travel. This entire passage system is filled with balls 23, and when the screw and nut are rotated relative to one another the balls roll through the thread groove system, emerge from the nut at the other end, pass through the channel 28 into the return channel 24 and move along the return channel to the starting point. A nut and screw assembly of this type is substantially frictionless in operation and is non-locking. Nut 15 has its outer periphery fitted snugly within the tube 14 which therefore serves as a cover for the ball return passageway 24. The lower end of the screw is counter-turned to receive a washer 31 which is held in place by means of a snap ring 32 for the purpose of preventing unintentional disassembly of the screw system.

At the upper end of the nut suitable gearing is located in the housing 6 to operate the screw assembly from a crank. In the form of construction shown in Figure 2 bevel gearing is employed including a bevel gear 33 which is keyed to the upper end of the screw shaft as at 34 and held thereto by means of a nut 35. This gear meshes with a bevel gear 36 which is pinned at 37 to a cross shaft 38. The cross shaft is journalled in the bearings 39 of the head and passes to one side of the trailer vehicle where it extends through a bore in the side rail 2 to carry a crank 40.

One suitable form of lock in shown in Figure 3 for holding the shaft 38 against movement under the rotational force exerted upon it from the screw when the trailer is resting upon the prop. This lock comprises a ratchet member 41 having a plurality of teeth 42 cut in its outer periphery and pinned as at 43 to the shaft 38. A pawl 44 is pivotally mounted to the side rail 2 above the ratchet. The pawl is biased to off-center positions by means of a tension spring 45, one end of which engages a hook 46 projecting from the side rail while the other end engages a hook 47 on the pawl. The hook 46 is in line with the pivot 48 on which the pawl is mounted and the hook 47 is so located as always to be on one side or the other of the center line. The pawl has teeth 49 for engagement with the teeth 42 in the ratchet. Thus as the handle portion 50 of the pawl is moved up and down or "jiggled" the teeth 49 alternately permit one tooth of the ratchet to escape and pass before stopping the next one. Meanwhile spring 45, moving first to one side of the center, then the other, always biases the pawl so that one tooth or the other thereof engages the ratchet to limit its rotation. To lower the prop the operator jiggles the handle up and down and the prop is lowered with little or no exertion on the crank.

It will be clear from the foregoing description that the pawl will hold the operating shaft and therefore the prop mechanisms in fixed position against rotation in either direction. Referring to Figure 3, it will be noted that the pawl is in engagement with one of the teeth of the ratchet for preventing counter-clockwise rotation of the operating shaft. In other words, the tooth of the pawl is lying in solid engagement with the tooth of the ratchet, and there is no opportunity for rotation in the counter-clockwise direction. Should the ratchet tend to rotate in a clockwise direction, the next tooth of the ratchet will be effective for moving the previously engaged tooth of the pawl away from the ratchet. The pawl will snap across dead center under the influence of the spring 45, whereupon the other tooth of the pawl will engage a tooth on the opposite side of the ratchet. In this position, clockwise rotation of the ratchet is prevented. Thus, no matter which direction the operating shaft tends to rotate under the influence of rotative thrusts occurring by force exerted by the nut on the screw, the pawl will be effective for preventing prop movement.

Teeth 49 of the pawl in an intermediate position thereof clear all of the ratchet teeth. Therefore by holding the pawl in this intermediate position the operator may rotate the crank in either direction to lift or to lower the prop.

A modified form of mechanism, as shown in Figures 4 and 5, has a screw and nut assembly as previously described but the screw shaft at its upper end carries a worm wheel 52 which is keyed to the screw shaft and held in place by means of a nut 53. The outer tube 14 in this structure has a laterally extending housing 54 at one side which at its ends supports bearings 55 aligned to receive the crank shaft 38. Within the housing, shaft 38 carries a worm 56 which meshes with the worm wheel 52. This worm may be employed as a lock, depending upon its pitch or, if the angle of the worm threads is sufficiently acute that the worm is non-locking, then a lock of the kind shown in Figure 3 may be used in conjunction with the worm. Helical gears also may be used in place of a worm and worm wheel, in conjunction with a lock.

In the two-prop type of trailer structure shown in Figure 1 the prop assemblies are similar to one another and are operated in unison by means of a connecting rod 57 in the form of a tube having its ends extending over the portions of the shaft 38 extending from each prop assembly, the rod 57 and shaft 38 being pinned to one another as at 59. It will of course be understood that two props are not essential and that only one is used where the weight load is not excessive.

In Figure 4 a modified structure also is shown for attaching the prop assembly to the chassis. In this case the prop tube 7 is welded to the inward face of a channel member 60 intermedate the side walls thereof and the side walls of the channel in turn converge toward and into engagement with the tube as at 61. The upper end of the channel is capped as at 62 and the upper end of the prop tube 7 also is capped as at 63. Bolts 10 for fastening the prop assembly to the channel 4 pass through the channel 60 in the space between the tube 7 and the side walls of the channel 60 as shown in Figure 4.

Having described my invention, I claim:

1. A prop for a trailer comprising a pair of tubes, one arranged within the other, one of said tubes carrying prop wheels at a projecting endwise portion thereof and the other being adapted to be mounted rigidly upon a trailer frame, a screw supported by one of said tubes and a nut supported by the other in engagement with said screw, said nut and screw having mating grooves therein and being threadedly interconnected one with another through a plurality of balls disposed within said mating grooves whereby said nut and screw are substantially non-locking under weight load, said nut having an external slot, the opposite ends of which open into said grooves to provide a ball return passageway, rotatable means for effecting relative rotation between said nut and screw to effect telescopic movement of said tubes for positioning said prop wheels, an operating shaft mounted crosswise in the trailer frame for rotating said screw, said shaft including means for rotating the same, and self-locking mechanism on the operating shaft effective for locking the operating shaft and screw against rotation when the rotative thrust occurs through forces exerted by the nut on the screw.

2. A prop for a trailer comprising a tubular member adapted to be mounted upon a trailer frame, a second tubular member disposed within the first and carrying prop wheels therebeyond, a non-locking anti-friction nut and screw assembly having respective portions thereof supported respectively by said tubes, an operating shaft mounted crosswise in the trailer frame for rotating said screw, said shaft including means for rotating the same, and self-locking mechanism on the operating shaft effective for locking the operating shaft and screw against rotation when the rotative thrust occurs through forces exerted by the nut on the screw.

3. A prop mechanism for supporting the forward end of a semi-trailer, including the trailer frame, comprising; a tubular member depending from and attached to the trailer frame, a second tubular member telescopically mounted within said first tubular member and carrying ground engaging means on its lower end, a screw supported within the first-named tubular member, a nut fixed within the second tubular member, said nut being traversed by said screw for raising and lowering the prop by telescopic movement of said tubular members, a plurality of balls disposed between the screw-threads of the nut and screw and providing a non-locking anti-friction nut and screw assembly, means for returning the balls from the bottom to the top of the nut, an operating shaft mounted crosswise in the trailer frame for rotating said screw, said shaft including means for rotating the same, and self-locking mechanism on the operating shaft effective for locking the operating shaft and screw against rotation when the rotative thrust occurs through forces exerted by the nut on the screw.

4. A prop mechanism for supporting the forward end of a semi-trailer, including the trailer frame, comprising; a tubular member depending from and attached to the trailer frame, a second tubular member telescopically mounted within said first tubular member and carrying ground engaging means on its lower end, a screw supported within the first-named tubular member, a nut fixed within the second tubular member, said nut being traversed by said screw for raising and lowering the prop by telescopic movement of said tubular members, a plurality of balls disposed between the screw-threads of the nut and screws and providing a non-locking anti-friction nut and screw assembly, means for returning the balls from the bottom to the top of the nut, an operating shaft mounted crosswise in the trailer frame for rotating said screw, said shaft including means for rotating the same, a worm on the operating shaft and a worm wheel on the screw meshing with the worm, said worm and worm wheel being effective for locking the operating shaft and screw against rotation when the rotative thrust occurs through forces exerted by the nut on the screw.

5. A prop mechanism for supporting the forward end of a semi-trailer, including the trailer frame, comprising; a tubular member depending from and attached to the trailer frame, a second tubular member telescopically mounted within said first tubular member and carrying ground engaging means on its lower end, a screw supported within the first-named tubular member, a nut fixed within the second tubular member, said nut being traversed by said screw for raising and lowering the prop by telescopic movement of said tubular members, a plurality of balls disposed between the screw-threads of the nut and screw and providing a non-locking anti-friction nut and screw assembly, means for returning the balls from the bottom to the top of the nut, an operating shaft mounted crosswise in the trailer frame for rotating said screw, said shaft including means for rotating the same, a ratchet element fixed to the operating shaft, and a pawl adapted to engage the ratchet alternately at opposite sides for preventing rotation of the operating shaft in either direction, said pawl being moved from one position to the other when the direction of rotation of the operating shaft is reversed, whereby said pawl and ratchet are effective for locking the operating shaft and screw against rotation when the rotative thrust occurs through forces exerted by the nut on the screw.

JAMES J. BLACK.

REFERENCES CITED

The following references are of record in the file of this patent:

UNITED STATES PATENTS

| Number | Name | Date |
|---|---|---|
| 1,338,589 | Rapson | Apr. 27, 1920 |
| 1,393,497 | Cadman | Oct. 11, 1921 |
| 1,398,279 | Rapson | Nov. 29, 1921 |
| 1,565,805 | Jones | Dec. 15, 1925 |
| 2,232,187 | Reid | Feb. 18, 1941 |
| 2,233,135 | Ketel | Feb. 25, 1941 |